(12) United States Patent
Kirykowicz

(10) Patent No.: US 7,198,452 B2
(45) Date of Patent: Apr. 3, 2007

(54) BAR STOCK LOADING TABLE AND APPARATUS

(75) Inventor: Alex Kirykowicz, Elmwood Park, IL (US)

(73) Assignee: Ocenco, Inc., Pleasant Prairie, WI (US)

( * ) Notice: Subject to any disclaimer, the term of this patent is extended or adjusted under 35 U.S.C. 154(b) by 163 days.

(21) Appl. No.: 10/889,401

(22) Filed: Jul. 12, 2004

(65) Prior Publication Data

US 2005/0226712 A1    Oct. 13, 2005

Related U.S. Application Data

(60) Provisional application No. 60/560,506, filed on Apr. 8, 2004.

(51) Int. Cl.
*B23Q 5/22*    (2006.01)
(52) U.S. Cl. .................. 414/749.1; 82/127; 198/346.2; 198/347.2; 414/16; 414/911
(58) Field of Classification Search .................. 414/16, 414/22.51, 222.13, 222.01, 266, 279, 459–461, 414/471, 486, 491, 540, 541, 749.1, 911, 414/535; 193/35 R; 198/347.2, 347.3, 468.6, 198/346.2; 104/48; 82/127; 269/289 MR; 248/129

See application file for complete search history.

(56) References Cited

U.S. PATENT DOCUMENTS

| | | | |
|---|---|---|---|
| 3,370,727 A * | 2/1968 | Shaw | 414/495 |
| 3,587,885 A * | 6/1971 | Hanway | 414/529 |
| 3,841,462 A | 10/1974 | Schmidt | |
| 4,042,118 A | 8/1977 | Schmidt | |
| 4,378,072 A * | 3/1983 | Appleman et al. | 212/344 |
| 4,417,491 A | 11/1983 | Uehara | |
| 4,593,807 A | 6/1986 | Cattaneo et al. | |
| 4,815,371 A * | 3/1989 | Geremia | 100/35 |
| 4,929,138 A | 5/1990 | Breuning | |
| 4,971,508 A * | 11/1990 | Miyahara et al. | 414/282 |
| 5,018,563 A | 5/1991 | Yoder | |
| 5,108,245 A | 4/1992 | Palmer | |
| 5,115,702 A | 5/1992 | Link | |
| 5,326,210 A | 7/1994 | Savage | |
| 5,366,334 A | 11/1994 | Cucchi | |
| 5,505,584 A | 4/1996 | Berns | |
| 5,658,124 A * | 8/1997 | Presnell, III | 414/800 |
| 6,035,502 A | 3/2000 | Lussier et al. | |
| 6,044,735 A | 4/2000 | Crippa | |
| 6,199,461 B1 | 3/2001 | Geiser | |
| 6,272,955 B1 | 8/2001 | Scemama | |
| 2003/0017037 A1 * | 1/2003 | Turner | 414/535 |

FOREIGN PATENT DOCUMENTS

JP    2003-143714    *    5/2003

* cited by examiner

*Primary Examiner*—Donald Underwood
(74) *Attorney, Agent, or Firm*—Marshall, Gerstein & Borun LLP

(57) ABSTRACT

A bar stock loader for an elongate member and a method for use is includes a support apparatus with a support surface for supporting the elongate member and a translation apparatus proximate to the support apparatus. The translation apparatus is moveable and has an arm and a lifting mechanism for raising and lowering the arm. The translation apparatus is moveable between a first and second position whereby, when the translation apparatus is in the first position, the arm is positioned overlapping the support surface for receiving the elongate member, and when in the second position the arm is horizontally displaced from the support surface.

20 Claims, 3 Drawing Sheets

BAR STOCK LOADING TABLE AND APPARATUS

CROSS-REFERENCE TO RELATED APPLICATIONS

This application claims the benefit of U.S. Provisional Patent Ser. No. 60/560,506 which was filed on Apr. 8, 2004, the entire disclosure of which is hereby expressly incorporated by reference herein.

TECHNICAL FIELD

This patent relates to handling bar stock members in a manufacturing environment, and in particular to a bar stock loading table and mechanism.

BACKGROUND

Bar stock, which generally comes in the form of solid bars of metal, such as steel or copper (but which may be formed of other materials), is used as a source of starting material in numerous manufacturing processes. Typically, bar stock is delivered to a manufacturing facility in the form of elongate members, such as bars, which are circular in cross section and in the nature of six feet or longer in length. However, bar stock members may be formed in any desired shape and length. Within the manufacturing facility, the bar stock is provided from a storage area to a work area at which a cutting or machining tool may be used to cut the bar stock into smaller pieces of material or to machine the bar stock. When divided into smaller pieces of material, the bar stock may be melted, machined, etc. to produce components of a device being manufactured. Because bar stock is usually made of solid metal, an individual piece of bar stock is typically very heavy. Moreover, because bar stock is generally formed as elongate members with circular cross sections, bar stock rolls very easily and is difficult to stack on a flat table, thereby presenting a safety hazard when stored on a table or shelf above the floor.

Because of its elongated size and its weight, bar stock must generally be moved from a storage location within a manufacturing facility to a work area (at which a working tool is located) using a fork lift or other large and cumbersome mechanical means. Fork lifts, however, do not provide for fine control or adjustment, and it is therefore often difficult to deliver a piece of bar stock to a working tool at the precise location and orientation required by the working tool. As a result, a person must generally manually assist in such a transfer, which puts the person in harms way should the bar stock roll off of the fork lift, or should the fork lift operator accidentally cause sudden movement of the fork lift during the transfer process. Still further, this transfer process typically requires at least two persons.

In some situations, an inclined table may be used to facilitate parallel placement and movement of bar stock from a storage location to a working area. Several mechanisms for lifting or pushing the bar stock from a storage location to a final working position using an inclined table are shown in U.S. Pat. Nos. 5,108,245 and 4,503,807. However, because bar stock may be large, both in diameter and length, the bar stock has a great deal of weight and inertial mass. Uncontrolled movement down an inclined table may result in the bar stock having too much kinetic energy as the bar stock rolls into the final desired position. This kinetic energy may cause damage to the working tool, or may result in the bar stock jumping off of the table or working tool, creating a serious safety hazard. Lifting mechanisms that rely on an inclined table on the receiving portion for imparting motion to a bar have similar disadvantages.

SUMMARY OF THE DISCLOSURE

A bar stock loading mechanism has a table for supporting one or more bar stock members and a translation apparatus for lifting the bar stock members from the table and moving them to a work area. The table is generally flat and level to allow rolling the bar stock into position. Pins can be used to stop the bar stock members from rolling out of position or off the table. The translation apparatus, which may have at least one pair of arms for vertically lifting a bar stock member, may be moved, for example, on rails, to present the bar stock member at a work area. When the bar stock member is aligned with the work area, the arms are lowered to position the bar stock member onto rollers associated with an apparatus in the work area. Rollers built into the arms of the translation apparatus or an auxiliary roller can be used to facilitate unloading of the bar stock member onto the work area.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
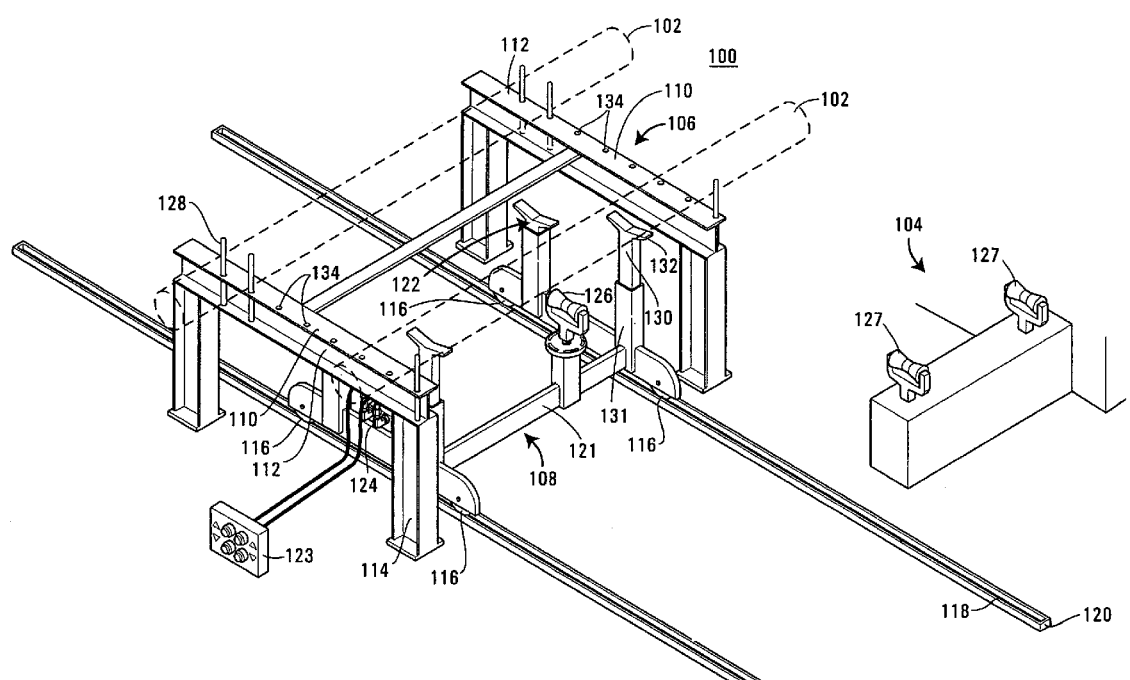
FIG. 1 is a perspective view of a bar stock loading mechanism having a translation device disposed in a first position.

FIG. 1 illustrates a bar stock loading mechanism 100 that may be used to store, at a first location, bar stock material 102, particularly items weighing more than an ordinary person can lift or move unaided, and to move the bar stock material 102 from the first location to a second location such as that associated with a working area 104 at which a working tool, such as a cutting machine (not shown) may be located. The bar stock loading mechanism 100 may generally be operated by a single person to move a particular bar stock member 102 to a precise location needed by a tool at the working area 104, without a significant safety hazard being caused by the loss of control of the bar stock 102 during the transfer process. As further discussed below, various principles are advantageously employed to optimize the handling of bar stock in a manufacturing or machining environment using the loading mechanism 100. In particular, the apparatus 100 allows loading and unloading bar stock from either end of a storage area while maintaining control of the kinetic energy of the bar stock at all stages during the transfer from the storage area to a working tool. For example, bar stock can be loaded onto the storage table from a cart at one end of the table and unloaded to a work area at the other end of the table. In another example, bar stock can be placed onto the storage area by overhead crane and unloaded to work areas at either end of the storage table. The length of the storage table and range of travel of the translation apparatus can be adapted to the different requirements of each installation.

Figure 2:
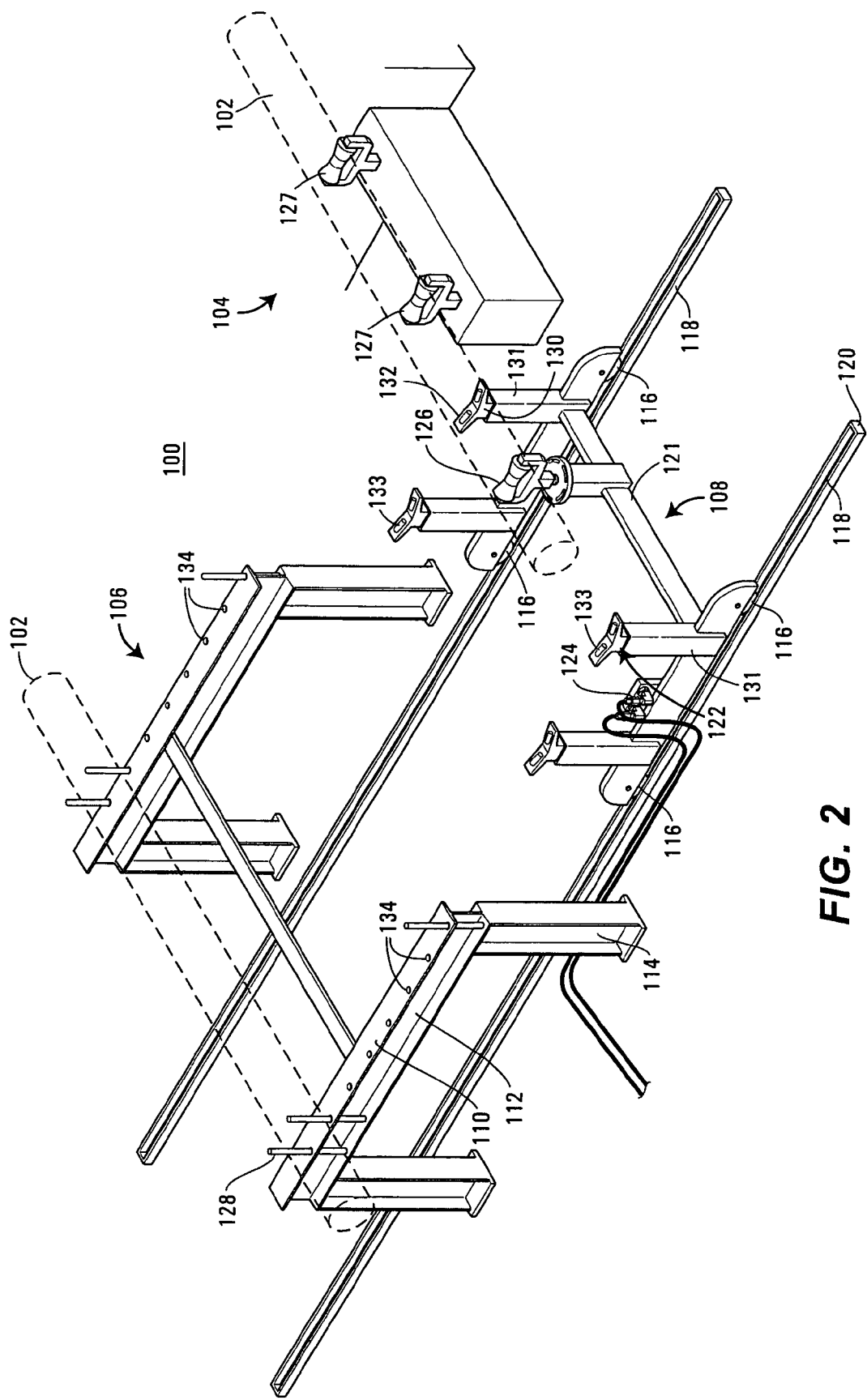
FIG. 2 is a perspective view of the bar stock loading mechanism of FIG. 1 having the translation device disposed in a second position.

As illustrated in FIGS. 1 and 2, the bar stock loading mechanism 100 includes two principle elements, namely, a support apparatus 106 and a translation apparatus 108. The support apparatus 106, also referred to as a support table, has two horizontal support members 112 supported by legs 114, which are preferably fixedly attached to the floor. Each of the support members 112 includes a top support surface 110 that supports the elongate bar stock members 102. The support members 112, illustrated in FIGS. 1 and 2 as I-beams, may include spaced-apart beams, bars or other suitable members that are able to withstand the load of one or more elongate bar stock members 102. Of course, more or fewer support members 112 may be used, as long as adequate support is provided for the bar stock members 102 placed thereon. The exact dimensions of the support members 112 may vary according to the number, size and density of items to be supported and the calculation of the suitable dimensions is within the skill of one of ordinary skill in the mechanical arts. The support surface 110 is sufficiently flat to allow rolling of the bar stock members 102 when the bar stock members 112 are circular or round in cross section.

As illustrated in FIGS. 1 and 2, holes 134 disposed within the support members 112 are adapted to receive one or more retaining members 128, which may be for example, pins. The retaining members 128, when placed in the holes 134, extend above the support surface 110 to limit motion of the bar stock members 102 and thereby prevent the bar stock members 102 from accidentally rolling off of the ends of the support table 106. If desired, the retaining members 128 may be removeably disposed in the holes 134 to enable control over the limits of movement of the bar stock members 102. In another embodiment, the retaining members 128 may be directed up from below the support surface 110 when in use and lowered below the support surface 110 when not in use.

Generally speaking, the translation apparatus 108 includes a support frame 121, one or more sets of arms 122 disposed on the support frame and a movement device that enables the support frame 121 to be moved horizontally with respect to the support table 106. Generally speaking, each of the arms 122 includes a vertical riser 130 disposed within a guide chamber 131 and a contact member 132 disposed at the top of the riser 130. The contact member 132 receives and supports the elongate members 102, and may be arcuate or V-shaped, for example, to be adapted for use with bar stock members 102 that are round or circular in cross section. Of course, the shape and construction of the contact members 132 should be suited to the type of bar stock being handled. For example, a U-shaped or flat contact member 132 may appropriate for square bar stock. Additionally, it may be desirable to have rollers 133 built into or disposed on the contact members 132 to enable a bar stock member 102 to move in an axial direction when the bar stock member 102 is disposed on or being support by the arms 112. These rollers 133 may supplement or replace an auxiliary support roller 126 which, as illustrated in FIGS. 1 and 2, is disposed on the frame 121 between two of the arms 122.

Still further, a lifting mechanism 123 is coupled to one of more of the sets of arms 122 to cause the risers 130 of the arms 122 to raise or lower with respect to the support table 106. In the embodiment illustrated in FIGS. 1 and 2, the lifting mechanism includes a hydraulic motor (not shown) connected via pressure hoses 124 to one or more hydraulically actuated pistons (not shown) disposed within the guide chambers 131 in a manner that moves the risers 130 up and down with respect to the floor or the support frame 121. While the lifting mechanism is illustrated in FIGS. 1 and 2 as being a hydraulically actuated lifting mechanism, other lifting mechanisms could be used instead or in addition, including motor driven (for example, electric motor driven) mechanisms, pneumatic mechanisms, and manual mechanisms, such as manually operated screws, foot pumps, etc. Of course, the lifting mechanism 123 may include whatever pistons, belts, gears etc. are needed to raise and lower the risers 130. The lifting mechanism 123 may be configured to control movement of the risers 130 in pairs, but may also control the risers 130 independently if so desired.

In the embodiment illustrated in FIGS. 1 and 2, the translation apparatus 108 includes wheels 116 mounted on the support frame 121 and tracks 118 in which the wheels 116 ride. The tracks 118 may have a closed end 120, or a block (not depicted), to prevent the wheels 116, and thereby the translation apparatus 108, from moving beyond a desired point. Furthermore, the tracks 118 serve to guide the wheels 116 along a straight line or along any other predetermined path to ultimately keep the support frame 121 and thereby the arms 122 aligned with a working tool in the working area 104. If desired, rollers may be used instead of the wheels 116 depending on the anticipated load and the surface under the translation apparatus 108. Likewise, guides may be used instead of tracks. In another embodiment, ball bearings may be disposed in the tracks 118 or on a lower surface of the support frame 121 to provide easy movement of the support frame 121 with respect to the tracks 118. While helpful to provide fixed movement of the support frame 121 between the support table 106 and the working area 114, the tracks 118 are not necessary in all uses.

In operation, one or more bar stock members 102 are first loaded onto the support table 106 for storage. The bar stock members 102 may be loaded using, for example, a forklift, the translation apparatus 108 (in a manner reverse to the use of the translation apparatus 108 described below) or in any other desired manner. At an appropriate time, such as when a bar stock member 102 is needed at the working area 104, the translation apparatus 108 is used to lift a bar stock member 102 off of the support table 106 and to move the bar stock member 102 to the working area 104 so that the bar stock member 102 is aligned with the working tool. In particular, the translation apparatus 108 may be moved from a first position (such as that illustrated in FIG. 1) generally beneath the support apparatus 106 to a second position (such as that illustrated in FIG. 2) wherein the bar stock member 102 can be moved onto the machining station of the working area 104. When in the first position illustrated in FIG. 1, the translation apparatus 108 is proximate to and may be disposed beneath the support apparatus 106. To attain this position, the translation apparatus 108 may be moved along the tracks 118 in, for example, a manual manner, to a position in which one of the sets of arms 122 aligns with a bar stock member 102 to be used while the bar stock member 102 rests on the support table 106. If needed, an operator may manually shift the bar stock member 102 on the support table 106 to align the bar stock member 102 with the set of arms 122. If severely misaligned, one arm of the set of arms 122 may be used to lift one end of the bar stock member 102 to aid in shifting it into alignment. The lifting mechanism 123 may then be operated to cause the risers 130 of the set of arms 122 to move upward until the support members 132 engage either side of the bar stock member 102 and lift the bar stock member 102 off of the support surfaces 110.

If desired, the bar stock member 102 may be lifted to be higher than the retaining members 128 or the retaining members 128 may be lowered or removed from the table 106 so that the retaining members 128 do not interfere with movement of the bar stock member 102 off of the end of the table 106. Next, the translation apparatus 108 is moved along the tracks 118 to a second position, such as that illustrated in FIG. 2, in which the bar stock member 102 is aligned with the working tool at the working area 104. The translation apparatus 108 may be moved manually, such as by being pushed by the operator, or may be articulated by a motor or winch (not depicted). The lifting mechanism 123 may be operated to vertically adjust the risers 130 to align the bar stock member 102 with the working tool at the working area 104. In some cases, one or more adjustable height auxiliary rollers 126 may be used to aid in moving the elongate member 102 from the translation apparatus 108 to rollers 127 associated with the working tool at the working area 104. As will be understood, the auxiliary roller 126 can be raised and lowered, generally by a screw-type mechanism, to an appropriate height with respect to the one or more rollers 127 associated with the working tool at the working area 104. The auxiliary roller 127 does not generally need adjustment once set because the work area rollers 127 are usually fixed in height.

The elongate member 102 can then-be moved to the machining apparatus as required. For example, the elongate member 102 can be pushed to the machining apparatus or working tool or may be captured and pulled by the working tool itself. Movement to the working tool is further facilitated if the contact member 132 has rollers 133, as discussed above. However, if the rollers 133 are not used, the lifting mechanism may be lowered so that the bar stock member 102 comes to rest on the auxiliary roller 126 and one or more of the rollers 127 associated with the machining or working tool at the working area 104. In either case, the rollers 126, 127 and, if present, 132 allow the bar stock member 102 to be easily pushed into the working area in a manner in which the bar stock is properly aligned with the working tool.

Figure 3:
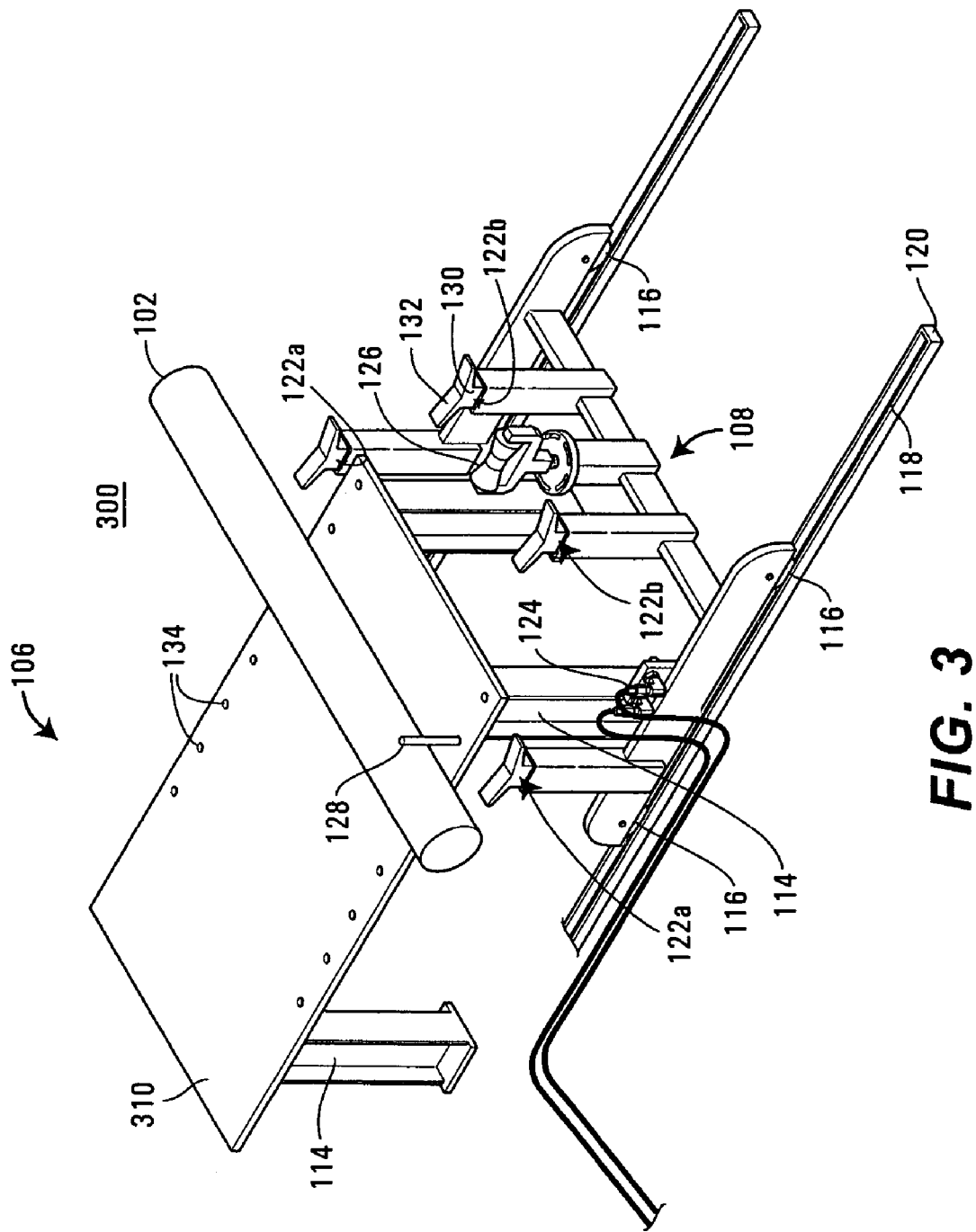
FIG. 3 is a perspective view of an alternate embodiment of a bar stock loading mechanism.

Referring to FIG. 3, a loading device 300 similar to that of FIGS. 1 and 2 is shown having the same general features of the loading apparatus 100, except that the table 310 includes a flat top 312 disposed between the supports 114. In this case, the tracks 118 are on the outside of the supports 114 so that bar stock members longer than width of the table top may be lifted off of the table using the first set of arms 122a disposed in the rear of the translation device 108 (as illustrated in the perspective view of FIG. 3) and so that bars longer than or shorter than the table top 312 may be rolled onto the set of arms 122b disposed in the near part of the translation device 108 (as illustrated in the perspective view of FIG. 3). The table 310 may be useful for handling shorter bar stock or for re-orienting bars before machining.

The apparatus and method discussed above are intended to and will alleviate problems caused by prior art bar stock loading devices. Using these principles will improve the handling of bar stock or other elongate members, particularly items of substantial size and weight that are difficult or impossible for a person to transport manually. Still further, the ability to move a translation apparatus 108 from a loading or storage area to a working area helps to assure that bar stock items are readily available for use. Still further, the loading devices illustrated and described herein generally enable a single person to store, move and load bar stock, even when the bar stock is very heavy or cumbersome.

Various embodiments of methods and apparatus for storing and moving bar stock and other elongate members have been discussed and described. It is expected that these embodiments or others in accordance with the present disclosure will have application to many kinds of manufacturing environments where personnel may wish to manage the movement and use of items substantially heavier than previously possible without the use of forklifts, cranes and other specialized equipment requiring advanced skill and training. Using the inventive principles and concepts disclosed herein advantageously allows or provides for an improved manufacturing floor environment from both safety and productivity standpoints.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The described embodiments were chosen and to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims and all equivalents thereof, when interpreted in accordance with the breadth to which they are fairly, legally, and equitably entitled.

I claim:

1. A loading device for use in moving an elongate member, comprising:
    a support surface adapted to support a plurality of elongate members side-by-side at a first position; and
    a translation apparatus moveable between the first position and a second position laterally spaced from the support surface, the translation apparatus including;
        one or more support arms;
        a lifting mechanism adapted to move the one or more support arms between a lower position and an upper position, the one or more support arms adapted to lift one of the plurality of elongate members from the support surface when moving from the lower position to the upper position; and
        a movement mechanism coupled to the one or more support arms and adapted to enable lateral movement of the support arms between the first position and the second position.

2. The loading device of claim 1 wherein the support surface comprises a table.

3. The loading device of claim 1 wherein the support surface comprises a beam.

4. The loading device of claim 1 wherein the support surface comprises a bar.

5. The loading device of claim 1 further comprising a retaining member.

6. The loading device of claim 5 wherein the retaining member is a pin.

7. The loading device of claim 5 wherein the retaining member is removably disposed in the support surface and repositionable along an axis parallel to a direction of the lateral movement.

8. The loading device of claim 1 wherein each arm further comprises a contact member for receiving the elongate member.

9. The loading device of claim 1 wherein the contact member is arcuate in shape.

10. The loading device of claim 1 wherein when the translation apparatus is in the first position the arm is operable to lift the elongate member off the support apparatus.

11. The loading device of claim 1 further comprising an auxiliary roller for supporting the elongate member when moving the elongate member from the translation apparatus.

12. The loading device of claim 11 wherein a height of the roller is adjustable.

13. The loading device of claim 1 wherein the translation apparatus further comprises wheels.

14. The loading device of claim 13 further comprising a rail for guiding wheels during lateral movement of the translation apparatus.

15. The loading device of claim 1 wherein the lifting mechanism is a hydraulic jack.

16. A lift for moving and positioning a bar comprising:
 a plurality of generally horizontal members;
 a vertical member coupled to each of the plurality of horizontal members;
 a support slidably attached to each vertical member;
 a lifting apparatus coupled to the support for raising the support relative to its vertical member;
 rollers coupled to the plurality of horizontal members;
 a rail supporting movement of the plurality of horizontal members along said rail; and
 an auxiliary roller arranged for moving the bar perpendicular to the plurality of horizontal members.

17. The lift of claim 16 further wherein the lifting apparatus is a hydraulic jack.

18. A loading device for use in moving an elongate member, comprising:
 a support surface adapted to support the elongate member at a first position; and
 a translation apparatus moveable between the first position and a second position laterally spaced from the support surface, the translation apparatus including;
 one or more support arms;
 a lifting mechanism adapted to move the one or more support arms between a lower position and an upper position; and
 a movement mechanism coupled to the one or more support arms and adapted to enable lateral movement of the support arms between the first position and the second position; and
 an auxiliary support arm arranged for moving the bar perpendicular to the plurality of horizontal members.

19. The loading device of claim 18, wherein the auxiliary support arm comprises a roller.

20. The loading device of claim 1, wherein the one or more support arms comprises two pairs of support arms, each pair of support arms adapted for use with a single elongate member.

* * * * *